United States Patent

[11] 3,593,098

| [72] | Inventor | Veijo V. Varnela<br>San Gabriel, Calif. |
|---|---|---|
| [21] | Appl. No. | 786,924 |
| [22] | Filed | Dec. 26, 1968 |
| [45] | Patented | July 13, 1971 |
| [73] | Assignee | Angstrom, Inc.<br>Chicago, Ill. |

[54] SPECTROMETER INTEGRATOR SYSTEM FOR PROVIDING OVERLAPPING INTEGRATION PERIODS
10 Claims, 2 Drawing Figs.

[52] U.S. Cl................................................. 320/1,
235/183
[51] Int. Cl................................................. G06g 7/18
[50] Field of Search........................................ 320/1;
235/183; 307/109, 112, 113, 114, 115

[56] References Cited
UNITED STATES PATENTS

| 2,577,814 | 12/1951 | Saunderson.................. | 320/1 X |
| 3,130,301 | 4/1964 | Minter......................... | 320/1 X |
| 3,353,444 | 11/1967 | Theiring...................... | 320/1 X |

*Primary Examiner*—Terrell W. Fears
*Assistant Examiner*—Stuart Hecker
*Attorney*—Christie, Parker & Hale ABSTRACT: Spectrometer photocurrent integrator apparatus for analyzing different component groups of a radiation spectrum over different, overlapping integration periods utilizing the dual component ratio technique and a common reference component. The apparatus includes a plurality of integrators coupled to a reference component transducer in such manner that the current integrated by any one of the integrators is unaffected by the occurrence of contemporaneous integrations by any one or more of the other integrators.

PATENTED JUL 13 1971  3,593,098

Veijo V. Varnela,
INVENTOR.
BY.

David Weiss

ATTORNEY.

SPECTROMETER INTEGRATOR SYSTEM FOR PROVIDING OVERLAPPING INTEGRATION PERIODS

FIELD OF THE INVENTION

This invention relates to spectrometers, and more particularly to apparatus for integrating photoelectric currents corresponding to components in a radiation spectrum.

Although the present invention is described herein with reference to a direct-reading emission spectrometer, the invention finds application in all types of analytical apparatus utilizing spectral techniques. For example, spectrometers for the analysis of radiation from self-excited bodies and spectrometers utilizing absorption techniques, are included within the scope of the present invention.

INTRODUCTION

A typical analysis of a material by emission spectrometry involves exciting the material to emit electromagnetic radiation, and quantitatively evaluating the radiation spectrum which characterizes the various elements contained in the material. The emitted radiation is dispersed into a spectrum having components arranged in order of their wavelengths. The presence of a spectral component having a specific wavelength, therefore, indicates the presence of a particular element within the material, and the relative intensities of the radiant energy in the spectral components are measures of the concentrations of the indicated elements.

In order to compensate for compositional and structural variations in the material under analysis, and for instrument variations which simultaneously affect the intensities of all spectral components (e.g., excitation variations), it is normal practice to measure the intensity of each spectral component corresponding to elements of interest, and to compare these intensities with an intensity selected as a reference. The selection of a reference to be used as a comparison is dependent upon the application. For example, in materials having a particular, known element always present in relatively high concentrations, a spectral component corresponding to that element is often selected. When the reference corresponds to a particular element in the material under analysis, it is usually referred to as an "internal standard." Alternatively, the reference can be the intensity of the total emitted radiation, the nondispersed radiation, or a selected group of spectral components. As used herein, the selected reference will be referred to as a "reference component;" spectral components corresponding to element whose relative concentrations are to be determined will be called "element components."

In one type of direct-reading spectrometer, the radiant energy of each spectral component is received by a respective photoelectric transducer such as a photomultiplier tube, during a common "excitation period," i.e., the time during which the material under analysis is being excited. The photomultipliers generate electrical signals proportional to the intensities of the radiant energy in the spectral components. Because the intensity of the emitted radiation can fluctuate during the excitation period, it has been found practical to integrate the electrical signals from the photomultipliers over a period of time known as an "integration period."

Signal integration is generally accomplished by applying each of the photomultiplier current outputs to respective integrator means, each including charging means such as an integrator capacitor, and charging the capacitors during an integration period. The ratio of the integrated voltage across an element capacitor (i.e., a capacitor associated with an element spectral component) with respect to the integrated voltage across a reference capacitor (i.e., a capacitor associated with a reference component) is proportional to the ratio of element to reference component intensities, generally referred to as an "intensity ratio." An integration period common to both an element capacitor and the reference capacitor should be utilized to provide a meaningful intensity ratio.

It is frequently desirable to determine intensity ratios over integration periods corresponding to different time intervals within a total excitation period. Aside from identification (wavelength) characteristics, many elements respond differently to identical excitation in that the intensities of their respective spectral components vary with time. A development of spectral intensity with respect to time during an excitation period is known as an element's "evolution," the characteristics of which are determined only in part by the nature of the material's excitation.

For example, certain elements in certain materials (e.g., iron in steel) rapidly approach a constant intensity near the beginning of the excitation period. Because of this relatively uniform evolution, such elements are useful as internal standards.

Other elements (e.g., sulfur and tin) volatilize readily so that their concentrations (and hence the intensities of their spectral components) decrease appreciably with time during the excitation period. In the case of these elements, integration should be completed early in the total excitation period; otherwise the signal-to-background ratio will be reduced due to the continued integration of spectral background and photomultiplier dark current after the element has been volatilized from the material under analysis.

Still other elements (e.g., tungsten and molybdenum) have refractory characteristics, the intensity of their respective spectral components slowly increasing with time to a relatively uniform level during the excitation period. In the case of these elements, integration should occur late in the total excitation period; otherwise the signal-to-background ratio will be reduced due to the integration of spectral background and photomultiplier dark current prior to the full evolution of the element.

In addition to signal-to-background ratio considerations, the precision and accuracy of an analysis will be enhanced if the initiation and termination of the integration period occur when the intensity ratio is varying least with time. Under these conditions, slight time differences in integration periods due to imprecise switching will have the least effect on the intensity ratio. Assuming the reference has been chosen for uniform evolution with time (i.e., nonvolatile and nonrefractory), this requires that the volatile elements be integrated early in the total excitation period before intensities begin to decrease through volatilization, and that the refractory elements be integrated later in the total excitation period after intensities have attained a relatively uniform level.

Obviously, signal-to-background ratios and precision and accuracy cannot be optimized for both volatile and refractory elements in an analysis where intensity ratios are determined over an integration period common to all elements.

SUMMARY OF THE INVENTION

The present invention provides apparatus for integrating photocurrents generated by the various transducers, in such manner that different elements (or element groups) can be analyzed over different overlapping integration periods utilizing the dual component ratio technique and a common reference element. A plurality of element integrators is provided for connection to respective element transducers, and a plurality of interconnected reference integrators is provided for all integration periods desired in an analysis. Means are provided for correlating selected element integrators with a corresponding reference integrator, such that the integration periods for combinations of correlative integrators are common to all integrators in a particular combination.

The reference integrators individually integrate current generated by the reference transducer in such manner that the current integrated by any one of the reference integrators is unaffected by contemporaneous current integrations by other reference integrators. Integration commencement and termination times of each combination of integrators can therefore proceed in accordance with any desired analysis program, and integration periods can occur over different time intervals within the excitation period in accordance with the most useful portions of the evolution curves characteristic of the various elements in the material being analyzed.

In a preferred embodiment of the integrator apparatus according to the present invention, a plurality of reference integrator capacitors are adapted to be individually connected in series with the reference transducer at any time during an excitation period, for commencing current integration by the connected capacitor. Since the transducer is substantially a current source with infinite impedance, introduction of any one of the capacitors into the series connected circuit does not affect the charge already stored in any of the capacitors, nor does it affect subsequent charging rates of any of the capacitors.

The reference capacitors are further adapted to be individually disconnected from the series circuit at any time during the excitation cycle, for terminating the current integration. Means are provided for permitting circuit continuity when a capacitor is disconnected, so that the charging of other capacitors remaining in the circuit is unaffected by a capacitor's disconnection therefrom.

BRIEF DESCRIPTION OF THE DRAWING

The novel features which are believed to be characteristic of the invention, together with further advantages thereof, will be better understood from the following description considered in connection with the accompanying drawing in which the preferred embodiment of the invention is illustrated by way of example. It is to be expressly understood, however, that the drawing is for the purpose of illustration and description only, and is not intended as a definition of the limits of the invention.

DETAILED DESCRIPTION OF THE INVENTION

Figure 1:
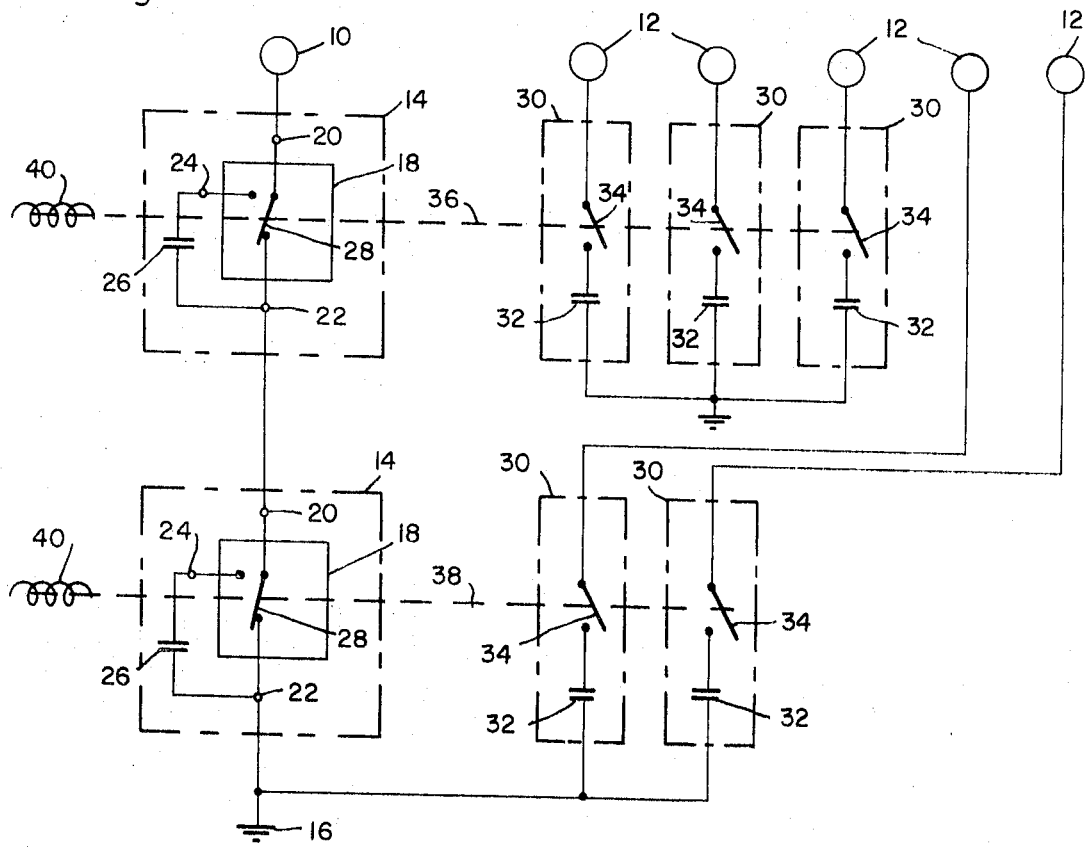
FIG. 1 is a circuit diagram of a preferred embodiment of integrator apparatus according to the present invention.

Turning first to FIG. 1, multiple integrator apparatus is shown in combination with a plurality of photoelectric transducers included by a spectrometer. The plurality includes a reference transducer 10 for translating a reference component of a radiation spectrum into a corresponding reference current, and further includes various element transducers 12 for translating respective element components of the radiation spectrum into corresponding element currents.

The integrator apparatus includes a plurality of reference integrators 14 series connected between the reference transducer and a biasing potential such as ground, indicated by a conventional ground symbol 16.

Each of the reference integrators 14 includes a switching means 18 having a current input terminal 20, a current output terminal 22 and an auxiliary terminal 24, and further includes charging means such as a reference capacitor 26 connected between the output terminal 22 and the auxiliary terminal 24.

The switching means 18 has a first alternative configuration for providing a current path between the input terminal 20 and the output terminal 22, and a second alternative configuration for providing a current path between the input terminal 20 and the auxiliary terminal 24. For example, the switch means 18 can include a double-throw switch 28 for connecting the input terminal 20 alternatively to the output terminal 22 and to the auxiliary terminal 24.

Although two reference integrators 14 are shown in FIG. 1, it should be emphasized that additional integrators can be included in the plurality. Series connection of reference integrators is provided by connecting the switching means output terminal 22 of an integrator 14 to the switching means input terminal 20 of the next succeeding integrator of the series, although the switching means input terminal 20 of the first reference integrator and the switching means output terminal 22 of the last integrator are connected to the reference transducer 10 and to ground 16, respectively.

It is apparent that, during times when a particular switch 28 is closed to its auxiliary terminal 24, the associated reference capacitor 26 is series connected between the input and output terminals 20, 22. During times when the switch 28 is closed to the output terminal 22, a current path bypassing the associated capacitor 26 is provided between the input and output terminals 20, 22. The interval of time during which a particular reference capacitor 26 charges is dependent upon its respective switch configuration.

The integrator apparatus of the present invention further includes a plurality of element integrators 30, each of which is connected between a respective element transducer 12 and a biasing potential such as ground.

Each element integrator 30 includes charging means such as an element capacitor 32 connected between ground and respective switching means such as a switch 34, for alternatively connecting and disconnecting an element capacitor 32 with respect to its respective element transducer. During times when the switch 34 of a particular element integrator 30 is in a closed configuration, its associated element capacitor 32 charges at a rate determined by the magnitude of the element current generated by its connected element transducer 12. When the switch 34 is caused to assume an open configuration, capacitor charging terminates.

The structure of the various element integrators 30 can be similar to the structure of the reference integrators 14 shown in FIG. 1. In this alternative element integrator structure, however, the current input terminal 20 of each of the integrator switching means is connected to a respective element transducer 12, while the current output terminal 26 is connected to the biasing potential or ground.

The element integrators 30 and the reference integrators 14 are correlated into a plurality of combinations, each combination including a respective reference integrator 14 and at least one selected element integrator 30. Two such combinations are shown in FIG. 1, a first combination indicated by a second dashed coupling line 38.

All the switches in a respective integrator combination are operatively controlled for providing simultaneity of integration commencement times and simultaneity of integration termination times among correlative integrators. For example, the various switches 28, 34 can include relay poles, and all switches in a particular integrator combination can be simultaneously operated by energization and deenergization of respective relay coils 40, in accordance with a predetermined program of integration commencement times and integration termination times provided by the spectrometer's programing means (now shown).

Figure 2:
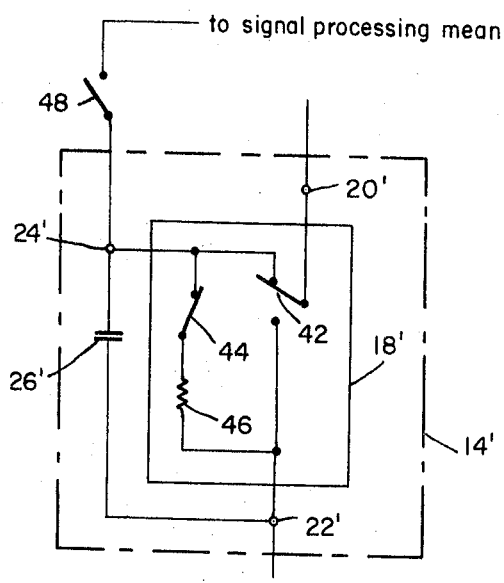
FIG. 2 is an alternative circuit configuration of the switching means of the preferred embodiment of the integrator apparatus shown in FIG. 1.

An alternative integrator configuration 14' is shown in FIG. 2, wherein primed reference numerals are utilized to indicate reference integrator components similar to those of FIG. 1. It should be realized, however, that the alternative integrator structure 14' can be satisfactorily substituted for the element integrators 30 shown in FIG. 1.

The switch means 18' of the alternative integrator 14' includes a double-throw switch 42 for connecting the current input terminal 20' alternatively to the auxiliary terminal 24' and to the current output terminal 22', and further includes a single-throw switch 44 connected between the auxiliary terminal 24', and the output terminal 22'. A protective resistor 46 can be provided, for preventing arcing between switch contacts since the switch 44 functions to discharge the capacitor 26' between analyses.

Prior to the beginning of an excitation period, the double-throw switch 42 and the single-throw switch 44 are each closed to the auxiliary terminal 24'. At the beginning of the excitation period, therefore, a current path is provided between the input terminal 20' and the output terminal 22' bypassing the capacitor 26'. When it is desired to commence an integration period, the single-throw switch 44 is opened with respect to the auxiliary terminal 24', so that the current path between the input terminal 20' and the output terminal 22' includes the capacitor 26'. Charging of the capacitor 26' is terminated by closing the double-throw switch 42 to the output terminal 22'.

When the element integrators include the structure 14' of FIG. 2, the single-throw switches 44 of correlative integrators are mutually controlled for producing simultaneity of integration commencement times. Similarly, all double-throw switches 42 of correlative integrators are controlled for producing simultaneity of integration termination times.

After the last integration has been completed by the integrators 14', the voltages across the integrator capacitors 26' correspond to the various integrated photocurrents. "Read" switches 48 are provided for applying the voltage signals available at the auxiliary terminal 24' to a signal-processing means (not shown). If desired, the read switches 48 of all integrators (reference and element) can be connected to a common "read line" (now shown), which in turn is connected to the signal-processing means, for permitting serial readout of the voltage signals upon sequential operation of the various read switches 48.

Of course, the integrator configurations shown in FIG. 1 can be provided with similar read switches 48. For an integrator indicated as a reference integrator 14 in FIG. 1, the corresponding read switch 48 is connected to the auxiliary terminal 24; for an element integrator 30, the read switch is connected to the ungrounded side of the element capacitor 32.

It should be observed that, although the integration termination times of the integrator apparatus of the present invention can be controlled by predetermined voltage levels of the reference integrator capacitors, greater versatility in spectrochemical analyses is provided when integrations are performed over a fixed time period. Therefore, fixed time integration techniques are preferably utilized in practicing the present invention, i.e., common integration periods extend over respective time intervals which have been predetermined in accordance with pertinent evolution data.

Thus, there has been shown two embodiments of current integrator apparatus for utilization in a spectrometer, and which provide a plurality of separate integrations over different common integration periods.

Modifications of the embodiments herein presented, and other combinations and permutations of the integrator pluralities disclosed, may be developed without departing from the essential characteristics thereof. For example, multiple references (including multiple internal standards) can be utilized in a spectrochemical analysis by connecting a second series connected reference integrator plurality to a second reference transducer. Similarly, more than one integrator can be series connected to a particular element transducer for providing element integration periods respectively common to different references.

Accordingly, the invention should be limited only by the scope of the claims listed below.

What I claim is:

1. In a spectrometer including photoelectric transducers, current integrator apparatus comprising the combination of:
   a plurality of first integrators coupled to a selected one of the transducers, said first integrators respectively adapted to commence and to terminate integrations of current generated by the selected transducer at predetermined times such that the current integrated by any one of said first integrators is independent of contemporaneous current integrations by others of said first integrators;
   a plurality of second integrators connected to respective others of the transducers, said second integrators respectively adapted to commence and to terminate integrations of current generated by said respective others at predetermined times; and
   a plurality of correlator means respectively correlating at least one selected second integrator with a corresponding first integrator, for providing simultaneity of integration commencement times and simultaneity of integration termination times among correlative integrators.

2. The apparatus according to claim 1, above, wherein said first integrators are series connected to the selected transducer.

3. In a spectrometer including photoelectric transducers, current integrator apparatus comprising the combination of:
   a plurality of series-interconnected first integrators, said plurality connectable between a selected one of the transducers and a biasing potential, said first integrators respectively adapted to commence and to terminate integrations of current generated by the selected transducer at predetermined times;
   a plurality of second integrators respectively connectable between others of the transducers and a biasing potential, said second integrators respectively adapted to commence and to terminate integrations of current generated by said others at predetermined times; and
   a plurality of correlator means respectively correlating at least one selected second integrator with a corresponding first integrator, for providing simultaneity of integration commencement times and simultaneity of integration termination times among correlative integrators.

4. The apparatus according to claim 3, above, wherein each of said first integrators includes:
   switching means having a current input terminal, a current output terminal, and an auxiliary terminal, said switching means having a first alternative configuration for providing a current path between said input and output terminals, and a second alternative configuration for providing a current path between said input terminal and said auxiliary terminal; and
   a capacitor connected between said auxiliary terminal and said output terminal.

5. The apparatus according to claim 3, above, wherein each of said first integrators includes:
   a capacitor; and
   switching means having a current input terminal and a current output terminal, said switching means having a first alternative configuration for providing a current path between said input and output terminals bypassing said capacitor, and a second alternative configuration for series connecting said capacitor between said input and output terminals.

6. The apparatus according to claim 3, above, wherein each of said first integrators includes:
   switching means having a current input terminal, a current output terminal, and an auxiliary terminal;
   a capacitor connected between said auxiliary terminal and said output terminal;
   said switching means having a first alternative configuration for providing a current path between said input and output terminals bypassing said capacitor, and a second alternative configuration for providing a current path between said input and output terminals through said capacitor.

7. In a spectrometer including photoelectric transducers, current integrator apparatus comprising the combination of:
   circuit means connectable between a selected one of the transducers and a biasing potential;
   a plurality of first capacitors;
   a plurality of first switching means for inserting in series connection respective ones of said first capacitors into said circuit means at predetermined times, and alternatively for withdrawing respective ones of said first capacitors from said series connection and circuit means at predetermined times;
   a plurality of second capacitors;
   a plurality of second switching means for individually connecting said second capacitors to respective others of the transducers at predetermined times, and alternatively for individually disconnecting said second capacitors from said respective others;

a plurality of correlator means respectively correlating at least one selected second switching means with a corresponding first switching means, for providing simultaneity of operation among correlative switching means.

8. In a spectrometer including a reference transducer and a plurality of element transducers, integrator apparatus comprising the combination of:
   a plurality of first integrators series connectable to the reference transducer, each of said first integrators adapted to receive current generated by the reference transducer for producing an integration of the current extending over a time interval, the current integratable by any one of said first integrators being independent of overlapping integrations by others of said first integrators extending over other time intervals;
   a plurality of second integrators respectively connectable to the element transducers and adapted to receive current generated by a respective element transducer, for producing a discrete integration of current generated by each element transducer extending over a corresponding time interval; and
   correlator means correlating said first and second integrators into at least two combinations, each combination including one first integrator and at least one second integrator, for controlling integrations producible by each combination to extend over respectively common time intervals.

9. In a spectrometer having a first transducer with an output current proportional in magnitude to a property of a material being analyzed, an output-current integrator capable of performing several integrations over different and overlapping time periods, comprising:
   a pair of capacitors; and
   means for connecting the capacitors to the first transducer to receive the output current, including switching means having a first selectable mode placing the capacitors in series connection for simultaneous integration of the current, and a second selectable mode in which only one of the pair of capacitors is connected to receive and integrate the output current, the capacitors having separate output terminals on which voltage can be measured to determine the charge on each capacitor subsequent to the respective integration period.

10. Apparatus as defined in claim 9 in which the spectrometer further includes a plurality of element transducers with associated element-current integrators, said first transducer being a reference transducer, and in which a switching means is connected to the element-current integrators to initiate and terminate integration of selected groups of the element-current integrators in synchronism with the reference-current integration of the respective capacitors.